Aug. 13, 1929.  M. J. TAMBLYN  1,724,809

PULLEY

Filed May 16, 1928

INVENTOR
Milton J. Tamblyn
BY
Kerr Hudson & Kent
ATTORNEYS

Patented Aug. 13, 1929.

1,724,809

UNITED STATES PATENT OFFICE.

MILTON J. TAMBLYN, OF CLEVELAND, OHIO, ASSIGNOR TO THE OSBORN-CREW MANUFACTURING COMPANY, OF CLEVELAND, OHIO, A CORPORATION OF OHIO.

PULLEY.

Application filed May 16, 1928. Serial No. 278,246.

This invention relates to a pulley, and the object of the invention is to produce a sheet metal pulley having a screw member permanently attached to the pulley, so that the pulley may, by means of the screw, be attached to any part from which it is to be supported.

Figure 1:
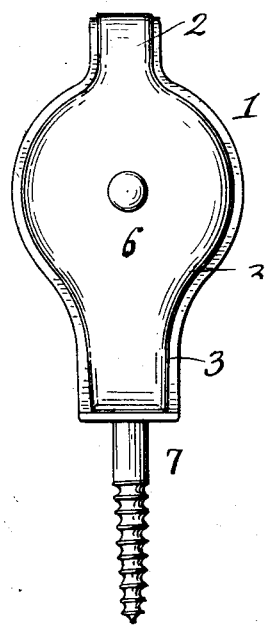
Figure 2:
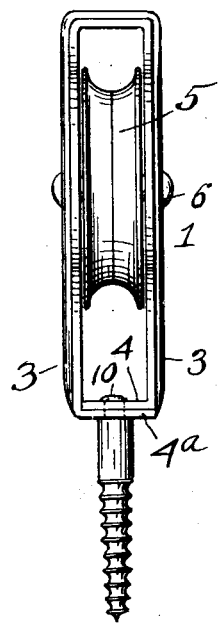
Figure 3:
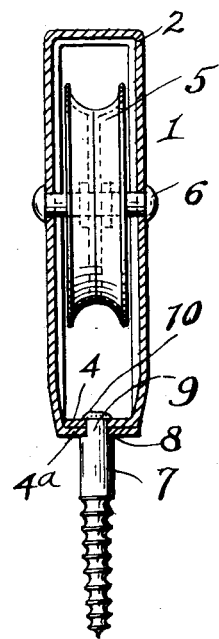
Figure 4:
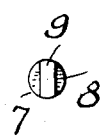
Figure 5:
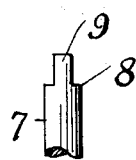

Reference should be had to the accompanying drawings forming a part of the specification, in which Figure 1 is a side elevation.
Figure 2 is an end elevation, and
Figure 3 is a sectional elevation.
Figure 4 is a plan of member 7.
Figure 5 is an elevation of member 7.

Referring to the drawings, it will be noted that the casing or body portion of the pulley is formed from a single stamping of metal, the stamping being provided with oppositely disposed rounded parts 1, as will be clearly seen in Figure 3. The oppositely disposed parts 1 are connected with each other by means of a narrow angular connecting piece 2, the edge of which may be embossed in order to strengthen the structure.

At the opposite end of the pulley, to that which has just been described, there are portions 3 extending from the oppositely disposed parts 1, these members 3 terminating in parts which are turned at right angles to each other, as indicated at 4 and 4ª, these parts overlying each other and being in contact.

The structure which is thus far described forms a complete casing adapted to receive and retain the wheel which is indicated at 5. This wheel may be made in any desired manner, either of sheet metal sectional portions or solid, and the wheel is held in its casing by means of a rivet or pin 6 which extends centrally with respect to the annular parts 1.

The overlying angular portions 4 and 4ª are connected to each other, and the connection which is in the form of a screw member 7 not only serves to connect the parts 4 and 4ª, but also serves to provide the pulley proper with a threaded member by which it may be mounted in the place where it is to be used. The member 7 is provided adjacent the non-threaded end with a shoulder 8, thus providing a reduced neck portion 9 which is adapted to be inserted through aligned openings in the parts 4 and 4ª. After the assembly of the member 7 with respect to the parts 4 and 4ª is completed the end of the shank 9 is upset so as to provide the head 10, thus securely fastening the member 7 with respect to the parts of the pulley which have been described, and at the same time forming the means of attachment for the threaded member 7.

It should be noted that in the process of manufacture the member 7 is inserted and secured with respect to the flanges 4 and 4ª before the pulley is assembled with respect to the parts of the casing with which it cooperates.

The resultant structure produces a very strong and rigid device entirely capable of sustaining the usual strains to which a comparatively speaking light pulley of this character is subjected to in the course its normal usage.

The pulley is one which may be made at low cost of manufacture, the casing proper being made of sheet metal which may be stamped in one stamping and then bent to the form which it assumes in the finished pulley. As before stated, the threaded member 7 in its attachment with respect to the flanges of the casing of the pulley really performs a double function in the matter of securing certain parts of the pulley to each other and in also providing a secure attachment for the threaded member.

It will be obvious that an attaching member other than a threaded member may be used with equal facility.

Having thus described my invention what I claim is:

1. A pulley comprising a framelike member which is formed in one piece and provided with overlapping end members, an attaching member for mounting the pulley when it is to be used, said attaching member forming a rivet connection for the overlapping portions of the frame, and a wheel mounted in the frame.

2. A pulley comprising an integral metal casing having side members joined by a bent connecting member and also having overlapping flanges, an attaching member by which the pulley is mounted when in use, said attaching member having a portion of reduced diameter which extends through openings formed in the overlapping flanges, the portion of the attaching member which extends beyond the flanges being upset to thereby form a rivet connection, and a wheel mounted within the casing.

3. A pulley comprising a metal frame member formed in one piece and provided with overlapping end portions, and an attaching member by which the pulley is mounted when in use, said attaching member being adapted to extend through openings formed in the overlapping portions of the frame member and having a flange adapted to bear against one side of said overlapping portions, the end of said attaching member being upset upon the other side of said attaching portions whereby said portions are riveted together by the attaching member.

In testimony whereof, I hereunto affix my signature.

MILTON J. TAMBLYN.